United States Patent [19]

Argereu

[11] 4,163,403
[45] Aug. 7, 1979

[54] FEED TUBE BUSHING

[76] Inventor: William Argereu, Hickory Dr., North Scituate, R.I. 02857

[21] Appl. No.: 900,430

[22] Filed: Apr. 27, 1978

[51] Int. Cl.² .............................................. B23B 25/00
[52] U.S. Cl. .................................................... 82/38 A
[58] Field of Search ............................. 82/38 R, 38 A

[56] References Cited

U.S. PATENT DOCUMENTS

| 1,885,224 | 11/1932 | Brinkman et al. | 82/38 R |
| 3,752,259 | 8/1973 | Wright et al. | 82/38 A |
| 4,064,773 | 12/1977 | Apel et al. | 82/38 R |
| 4,100,827 | 7/1978 | Flemming | 82/38 A |

FOREIGN PATENT DOCUMENTS

| 2354742 | 5/1975 | Fed. Rep. of Germany | 82/38 A |
| 1320257 | 6/1973 | United Kingdom | 82/38 A |
| 1444849 | 8/1976 | United Kingdom | 82/38 A |

*Primary Examiner*—Harrison L. Hinson
*Attorney, Agent, or Firm*—Barlow & Barlow

[57] ABSTRACT

A non metallic member is inserted in the tube through which the bar stock is fed into and worked upon by the machine tools, such for instance, as a screw machine, and which serves to center and align the bar stock with the feed fingers.

4 Claims, 1 Drawing Figure

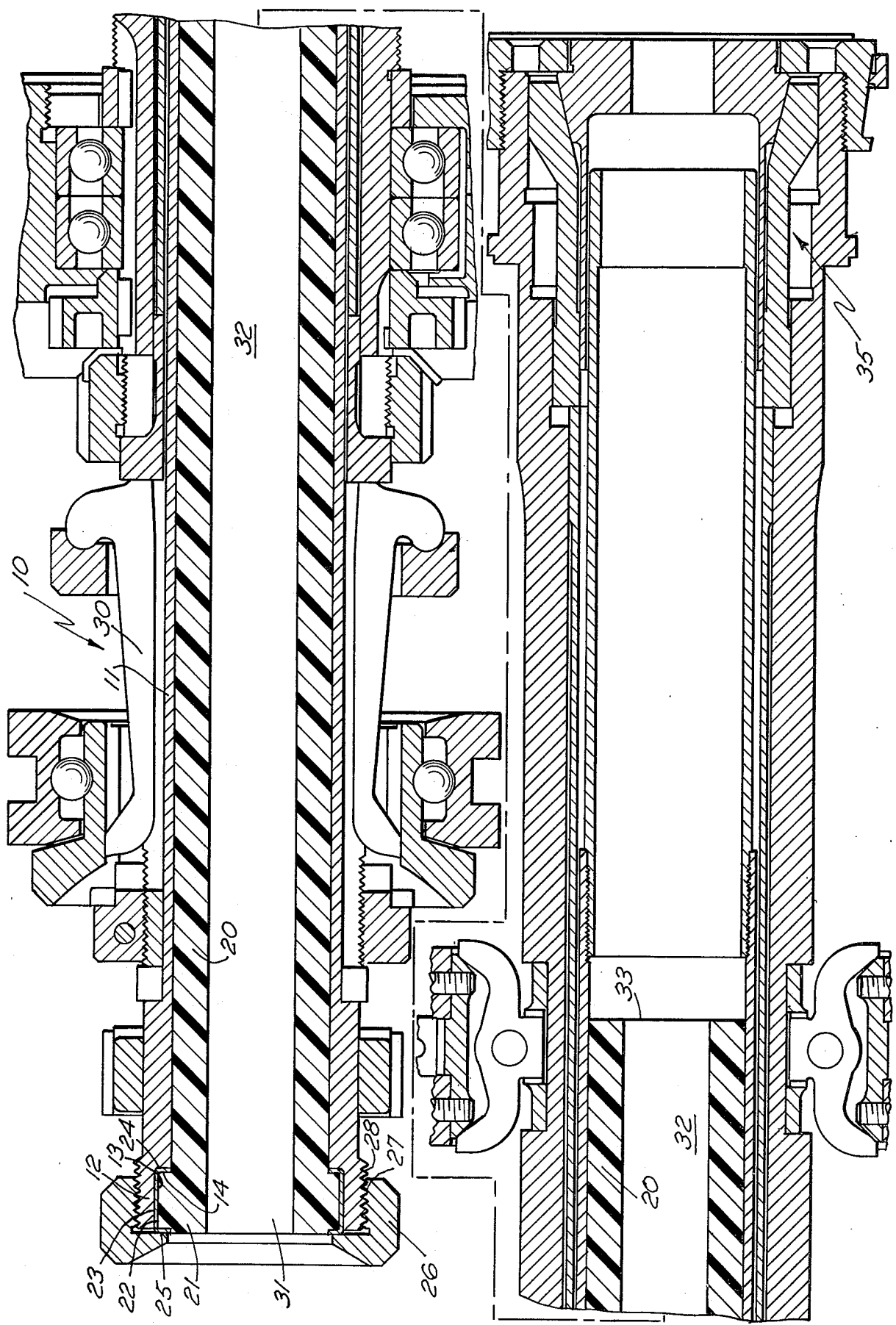

FEED TUBE BUSHING

BACKGROUND OF THE INVENTION

In the use of machines, such as screw machines, the bar of stock which is fed through a feed tube to the machine to be worked upon by various tools of the machine has a bushing at the entrance end of the feed tube spaced a considerable distance from the feed fingers which grip the stock as in U.S. Pat. No. 3,162,315. This results in a whipping of stock of a length between the guide and feed fingers at the rear end of the bar of stock, in some cases especially of soft metal stock causes damage which is objectionable.

SUMMARY OF THE INVENTION

I have found that by the use of a bushing member of non metallic material, such as polyurethane, fixed in a metal feed tube and extending a substantial length of the feed tube of the machine and having an enlarged head at one end to fit into a recess in the feed tube that the bar stock is aligned with the feed fingers and overcomes the above objection. However, the enlarged head of the non metallic member is often crushed because of squeezing the head into the recess in the feed tube, and I have provided a metal collar about this enlarged head which resists the compression of the nut which holds the non metallic bushing member into the feed tube and prevents its being crushed and allows it to be used over and over again.

DESCRIPTION OF THE DRAWINGS

The drawing is a sectional view in two different parts in order to utilize the enlarged size thereof showing the feed tube and the non metallic member within the feed tube in its working position.

DESCRIPTION OF THE PREFERRED EMBODIMENT

With reference to the drawing, the spindle of the machine is designated generally 10 and is equipped with a metal feed tube 11 which has an enlarged portion 12 at its entrance end with a recess at 13 forming a shoulder 14 in the tube.

The non metallic member of this invention is designated generally 20 and is usually formed of polyurethane and fits fairly closely in the tube 11. It is provided with an enlarged head 21 at the entrance end and about this enlarged end there is a metallic collar 22 having an outer wall 23 and curved ends 24 and 25 snugly embracing the enlarged head. This head and collar fit into the recess 13 in the feed tube and are held against the shoulder 14 by means of a cap 26 having screw threads 27 to engage the threads 28 on the enlarged portion of the feed tube 11 so as to hold the non metallic member 20 snugly within the feed tube and so that the non metallic member will rotate with the feed tube and also move axially with it. The feed tube is provided with a clutch means designated generally 30 which engages the feed tube for feeding it rotatively and also axially and releases through mechanism of the screw machine in the usual manner.

The bar stock which is fed in at the entrance opening 31 extends in fairly close engagement with the opening 32 in the non metallic bushing member 20 and extends beyond the inner end 33 of the non metallic member and through to the feed fingers designated generally 35 at the forward end of the feed tube. These feed fingers release and permit the feed tube to slide rearwardly as a new grip is desired on the work and then as the feed tube moves forwardly again, the bar stock is gripped by these fingers 35 and fed into the working position against a stop (not shown), as is usual in feeds of this character.

After the bar stock is fed forwardly against the stop, the tools of the machine work upon it to provide the work piece desired.

The inserts or bushings 20 will vary with the size of the feed tube of the machine and the opening 32 in the bushing 20 will vary with the size of the bar stock fed to the machine. For example, a feed tube of 2 inches OD diameter will have an ID of 1⅜ inches. The insert bushing will have an OD of 1⅜ inches and an opening 13/16 inches and a length of 14 inches. The drawing shows the insert 20 substantially full size. The opening 32 in the bushing will be near the size of the stock 0.040 inches clearance being preferable to allow the bar stock to slide freely and yet to control vibration sufficiently. Various shapes of square, round or oval with outside diameters of less than the inside diameter may be used.

The length of the bushing member also prevents whipping of the bar stock in the feed tube to damage the bar stock, particularly of soft material, and also decreases the waste length of the bar stock at the rear end thereof, shorter pieces being usable.

I claim:

1. In combination with a machine having a tool operating upon a bar from which the work is formed including a tube through which the bar is fed, a chuck for gripping the bar, a non metallic resilient member of a length greater than half the length of the tube within and fitting the inner diameter of the tube, said tube having an enlarged entrance opening at one end forming a shoulder spaced inwardly from said entrance end, said member having an enlarged head, a collar fixed on said head at said entrance end with its inner edge engaging said shoulder and a cap on the entrance end of said tube engaging the outer end of said collar to hold said member against said shoulder fixed in said tube.

2. In combination with a machine as in claim 1 wherein said tube and work rotate together.

3. In combination with a machine as in claim 1 wherein said tube and work rotate together and move axially together.

4. In combination with a machine as in claim 1 wherein there are feed means for moving the tube rearwardly with the member to obtain another grip on the bar for feeding the bar forward.

* * * * *